(12) United States Patent
Lancaster, III et al.

(10) Patent No.: US 11,407,536 B2
(45) Date of Patent: Aug. 9, 2022

(54) STRETCH WRAPPING MACHINE WITH VARIABLE FREQUENCY DRIVE TORQUE CONTROL

(71) Applicant: Lantech.com, LLC, Louisville, KY (US)

(72) Inventors: Patrick R. Lancaster, III, Louisville, KY (US); Daniel R. Hendren, Mount Washington, KY (US); Robert D. Janes, Louisville, KY (US)

(73) Assignee: LANTECH.COM, LLC, Louisville, KY (US)

( * ) Notice: Subject to any disclaimer, the term of this patent is extended or adjusted under 35 U.S.C. 154(b) by 341 days.

(21) Appl. No.: 16/657,177

(22) Filed: Oct. 18, 2019

(65) Prior Publication Data

US 2020/0122866 A1    Apr. 23, 2020

Related U.S. Application Data

(60) Provisional application No. 62/747,316, filed on Oct. 18, 2018.

(51) Int. Cl.
*B65B 11/02*    (2006.01)
*B65B 11/00*    (2006.01)

(52) U.S. Cl.
CPC ....... *B65B 11/025* (2013.01); *B65B 2011/002* (2013.01); *B65B 2210/18* (2013.01)

(58) Field of Classification Search
CPC ............. B65B 11/025; B65B 2011/002; B65B 2210/18
USPC .......................................................... 53/461
See application file for complete search history.

(56) References Cited

U.S. PATENT DOCUMENTS

| | | | |
|---|---|---|---|
| 4,387,552 A | 6/1983 | Lancaster et al. | |
| 4,991,381 A * | 2/1991 | Simons | B65B 11/045 |
| | | | 53/556 |
| 5,311,725 A * | 5/1994 | Martin | B65B 11/025 |
| | | | 53/556 |

(Continued)

FOREIGN PATENT DOCUMENTS

| | | |
|---|---|---|
| DE | 3119038 A1 | 12/1982 |
| DE | 3901704 A1 | 8/1990 |

(Continued)

OTHER PUBLICATIONS

PCT International Search Report and Written Opinion for PCT/US2019/056946, dated Dec. 31, 2019 (426WO).

(Continued)

*Primary Examiner* — Robert F Long
*Assistant Examiner* — Xavier A Madison
(74) *Attorney, Agent, or Firm* — Middleton Reutlinger

(57) ABSTRACT

A method, apparatus and program product utilize a torque control algorithm constrained by a speed window to control the dispense rate of a packaging material dispenser when wrapping a non-cylindrical load with packaging material. In particular, a dispenser motor of the packaging material dispenser that is controlled by a VFD may be driven to maintain a substantially constant torque, while also constrained to operate within a speed window that is based at least in part on a rate of relative rotation between the packaging material dispenser and the load.

32 Claims, 6 Drawing Sheets

(56) References Cited

U.S. PATENT DOCUMENTS

| | | | | |
|---|---|---|---|---|
| 5,315,809 | A * | 5/1994 | Gordon | B65B 11/025 53/399 |
| 5,581,979 | A * | 12/1996 | Scherer | B65H 23/14 53/389.4 |
| 5,836,140 | A * | 11/1998 | Lancaster, III | B65B 11/045 53/64 |
| 6,360,512 | B1 * | 3/2002 | Marois | B65B 11/006 53/399 |
| 6,414,455 | B1 | 7/2002 | Watson | |
| 6,698,161 | B1 * | 3/2004 | Rossi | B65B 11/00 53/382.2 |
| 8,448,412 | B2 | 5/2013 | Cere | |
| 9,776,748 | B2 | 10/2017 | Lancaster, III et al. | |
| 10,015,057 | B2 | 7/2018 | Djukic et al. | |
| 2003/0205034 | A1 | 11/2003 | Sus et al. | |
| 2006/0077246 | A1 | 4/2006 | Kawakami | |
| 2007/0204564 | A1 * | 9/2007 | Lancaster, III | B65B 11/006 53/399 |
| 2008/0216449 | A1 | 9/2008 | Zimmeril | |
| 2008/0258382 | A1 | 10/2008 | deJong et al. | |
| 2008/0263999 | A1 | 10/2008 | Ohlsson et al. | |
| 2009/0057477 | A1 | 3/2009 | Franklin et al. | |
| 2009/0178374 | A1 * | 7/2009 | Lancaster, III | B65B 11/025 53/441 |
| 2010/0320305 | A1 | 12/2010 | Lia | |
| 2011/0131927 | A1 * | 6/2011 | Lancaster, III | B65B 57/04 53/64 |
| 2011/0168751 | A1 | 7/2011 | Tsurumi | |
| 2012/0181368 | A1 | 7/2012 | Ekola | |
| 2014/0116006 | A1 | 5/2014 | Lancaster et al. | |
| 2014/0116008 | A1 | 5/2014 | Lancaster et al. | |
| 2014/0223864 | A1 | 8/2014 | Lancaster, III et al. | |
| 2014/0319194 | A1 | 10/2014 | Swanson et al. | |
| 2015/0197360 | A1 * | 7/2015 | Lancaster, III | B65B 11/025 53/461 |
| 2016/0096645 | A1 * | 4/2016 | Lancaster, III | B65B 57/18 53/64 |
| 2017/0039461 | A1 | 2/2017 | Winteraeken et al. | |

FOREIGN PATENT DOCUMENTS

| | | |
|---|---|---|
| GB | 1546523 A | 5/1979 |
| WO | WO9107341 A1 | 5/1991 |
| WO | WO2011057166 A2 | 5/2011 |
| WO | WO2017123832 A1 | 7/2017 |
| WO | WO2020033306 A1 | 2/2020 |

OTHER PUBLICATIONS

Yang, et al. "Study on Solidas Translational and Rotational Motions in Rotating Cans" University of Birmingham, 2014 Elsevier Ltd. 10 Pages.

* cited by examiner

STRETCH WRAPPING MACHINE WITH VARIABLE FREQUENCY DRIVE TORQUE CONTROL

FIELD OF THE INVENTION

The invention generally relates to wrapping loads with packaging material through relative rotation of loads and a packaging material dispenser.

BACKGROUND OF THE INVENTION

Various packaging techniques have been used to build a load of unit products and subsequently wrap them for transportation, storage, containment and stabilization, protection and waterproofing. One system uses wrapping machines to stretch, dispense, and wrap packaging material around a load. The packaging material may be pre-stretched before it is applied to the load. Wrapping can be performed as an inline, automated packaging technique that dispenses and wraps packaging material in a stretch condition around a load on a pallet to cover and contain the load. Stretch wrapping, whether accomplished by a turntable, rotating arm, vertical rotating ring, or horizontal rotating ring, typically covers the four vertical sides of the load with a stretchable packaging material such as polyethylene packaging material. In each of these arrangements, relative rotation is provided between the load and the packaging material dispenser to wrap packaging material about the sides of the load.

A primary metric used in the shipping industry for gauging overall wrapping effectiveness is containment force, which is generally the cumulative force exerted on the load by the packaging material wrapped around the load. Containment force depends on a number of factors, including the number of layers of packaging material, the thickness, strength and other properties of the packaging material, the amount of pre-stretch applied to the packaging material, and the wrap force or tension applied to the load while wrapping the load. An insufficient containment force can lead to undesirable shifting of a wrapped load during later transportation or handling, and may in some instances result in damaged products. On the other hand, due to environmental, cost and weight concerns, an ongoing desire exists to reduce the amount of packaging material used to wrap loads, typically through the use of thinner, and thus relatively weaker packaging materials and/or through the application of fewer layers of packaging material. As such, maintaining adequate containment forces in the presence of such concerns can be a challenge.

In particular, wrappers have historically suffered from packaging material breaks and limitations on the amount of wrap force applied to the load (as determined in part by the amount of pre-stretch used) due to erratic speed changes required to wrap loads. Were all loads perfectly cylindrical in shape and centered precisely at the center of rotation for the relative rotation, the rate at which packaging material would need to be dispensed would be constant throughout the rotation. Typical loads, however, are non-cylindrical, and in particular, generally box-shaped and have a square or rectangular cross-section in the plane of rotation, such that even in the case of square loads, the rate at which packaging material is dispensed varies throughout the rotation. In some instances, loosely wrapped loads result due to the supply of excess packaging material during portions of the wrapping cycle where the demand rate for packaging material by the load is exceeded by the rate at which the packaging material is supplied by the packaging material dispenser. In other instances, when the demand rate for packaging material by the load is greater than the supply rate of the packaging material by the packaging material dispenser, breakage of the packaging material may occur.

When wrapping a typical rectangular load, the demand for packaging material typically decreases as the packaging material approaches contact with a corner of the load and increases after contact with the corner of the load. When wrapping a tall, narrow load or a short load, the variation in the demand rate is typically even greater than in a typical rectangular load. In vertical rotating rings, high speed rotating arms, and turntable apparatuses, the variation is caused by a difference between the length and the width of the load, while in a horizontal rotating ring apparatus, the variation is caused by a difference between the height of the load (distance above the conveyor) and the width of the load. Variations in demand may make it difficult to properly wrap the load, and the problem with variations may be exacerbated when wrapping a load having one or more dimensions that may differ from one or more corresponding dimensions of a preceding load. The problem may also be exacerbated when wrapping a load having one or more dimensions that vary at one or more locations of the load itself. Furthermore, whenever a load is not centered precisely at the center of rotation of the relative rotation, the variation in the demand rate is also typically greater, as the corners and sides of even a perfectly symmetric load will be different distances away from the packaging material dispenser as they rotate past the dispenser.

The amount of force, or pull, that the packaging material exhibits on the load determines in part how tightly and securely the load is wrapped. Conventionally, this wrap force is controlled by controlling the feed or supply rate of the packaging material dispensed by the packaging material dispenser. For example, the wrap force of many conventional stretch wrapping machines is controlled by attempting to alter the supply of packaging material such that a relatively constant packaging material wrap force is maintained. With powered pre-stretching devices, changes in the force or tension of the dispensed packaging material are monitored, e.g., by using feedback mechanisms typically linked to spring loaded dancer bars, electronic load cells, or torque control devices. The changing force or tension of the packaging material caused by rotating a rectangular shaped load is transmitted back through the packaging material to some type of sensing device, which attempts to vary the speed of the motor driven dispenser to minimize the change. The passage of the corner causes the force or tension of the packaging material to increase, and the increase is typically transmitted back to an electronic load cell, spring-loaded dancer interconnected with a sensor, or to a torque control device. As the corner approaches, the force or tension of the packaging material decreases, and the reduction is transmitted back to some device that in turn reduces the packaging material supply to attempt to maintain a relatively constant wrap force or tension.

With the ever faster wrapping rates demanded by the industry, however, rotation speeds have increased significantly to a point where the concept of sensing changes in force and altering supply speed in response often loses effectiveness. Errors due to syncing between demand rate changes and supply response, as well as processing delays, can further exacerbate demand supply responses. In addition, feedback mechanisms such as load cells and dancer bars can be costly and/or undesirably increase the maintenance complexity of a machine.

In addition, whereas direct current (DC) motors have traditionally been used in packaging material dispensers due to the fact that DC motors can generally maintain a relatively constant torque without outside input, more recently a greater emphasis has been placed on using alternating current (AC) motors driven by alternating current variable frequency drives (VFDs), principally due to cost and maintenance advantages. It has been found, however, that conventional torque control methods available in VFDs have been found to be unable to provide a modulation of torque suitable for responding to the frequent speed changes associated with wrapping a rotating rectangular or other non-cylindrical loads.

Therefore, a significant need continues to exist in the art for an improved manner of reliably and efficiently controlling a wrapping machine, and in particular, for an improved manner of reliably and efficiently controlling an AC motor used in a packaging material dispenser of a wrapping machine.

SUMMARY OF THE INVENTION

The invention addresses these and other problems associated with the art by providing a method, apparatus and program product that utilize a torque control algorithm constrained by a speed window to control the dispense rate of a packaging material dispenser when wrapping a non-cylindrical load with packaging material. In particular, a dispenser motor of the packaging material dispenser that is controlled by a VFD may be driven to maintain a substantially constant torque, while also constrained to operate within a speed window that is based at least in part on a rate of relative rotation between the packaging material dispenser and the load.

Therefore, consistent with one aspect of the invention, a method of wrapping a non-cylindrical load with packaging material using a wrapping apparatus of the type including a packaging material dispenser for dispensing packaging material to the load may include generating relative rotation between the packaging material dispenser and the load about a center of rotation, and controlling a dispense rate of the packaging material dispenser during the relative rotation using an alternating current variable frequency drive (VFD) to maintain a substantially constant torque for a dispenser motor of the packaging material dispenser while maintaining a speed of the dispenser motor within a speed window that is based at least in part on a rate of relative rotation between the packaging material dispenser and the load.

In some embodiments, controlling the dispense rate to maintain the substantially constant torque for the dispenser motor while maintaining the speed of the dispenser motor within the speed window includes receiving a first input signal representative of the rate of relative rotation between the packaging material dispenser and the load, receiving a second input signal representative of dispenser motor torque, and controlling a speed of the dispenser motor in response to the first and second input signals to control the torque of the dispenser motor to match a torque setpoint. In addition, some embodiments may further include determining the torque setpoint by determining a torque window using a work offset, and determining the torque setpoint within the torque window using a wrap force parameter.

Also, in some embodiments, the packaging material dispenser prestretches the packaging material, and the work offset offsets a torque associated with prestretching the packaging material. Further, in some embodiments, the work offset varies as a function of packaging material thickness and/or packaging material type.

Some embodiments may further include determining the work offset in response to input of a packaging material thickness and/or a packaging material type, and in some embodiments, the wrap force parameter is a packaging material tension parameter. In addition, some embodiments may also include determining the wrap force parameter in response to input of a packaging material tension.

Some embodiments may also include determining the wrap force parameter in response to input of a desired containment force for the load. In addition, some embodiments may also include determining the wrap force parameter in response to input of one or more characteristics of the load.

Moreover, in some embodiments, receiving the first input signal includes receiving the first input signal from a rotational drive that generates the relative rotation. In some embodiments, receiving the first input signal includes receiving the first input signal from an encoder that senses the relative rotation. Moreover, in some embodiments, receiving the first input signal includes calculating a relative rotation speed.

In some embodiments, controlling the dispense rate to maintain the substantially constant torque for the dispenser motor while maintaining the speed of the dispenser motor within the speed window further includes determining the speed window using the first input signal, and holding a speed signal in the VFD within the speed window. In addition, in some embodiments, determining the speed window includes determining the speed window further using a load characteristic. Some embodiments may also include determining the load characteristic in response to input of a load size or a load dimension. Moreover, in some embodiments, determining the speed window further including the load characteristic includes controlling a width of the speed window based at least in part on the load characteristic. Also, in some embodiments, holding the speed signal in the VFD includes, in response to determining that an adjusted speed signal determined to maintain the substantially constant torque for the dispenser motor is outside of the speed window, setting the speed signal to a bounding speed of the speed window. In some embodiments, the second input signal is a current signal.

In addition, some embodiments may also include detecting a packaging material break using the second input signal. Also, in some embodiments, detecting the packaging material break includes detecting the packaging material break based upon the second input signal indicating a torque that is below a torque window. Moreover, in some embodiments, detecting the packaging material break includes detecting the packaging material break based upon the second input signal indicating a torque that is below the torque window for a predetermined duration.

Further, in some embodiments, controlling the dispense rate to maintain the substantially constant torque for the dispenser motor while maintaining the speed of the dispenser motor within the speed window is performed without sensing a tension in a web of the packaging material. Also, in some embodiments, the dispenser motor is an alternating current (AC) motor.

Consistent with another aspect of the invention, a method of wrapping a load with packaging material using a wrapping apparatus of the type including a packaging material dispenser for dispensing packaging material to the load may include generating relative rotation between the packaging material dispenser and the load about a center of rotation, controlling a dispense rate of the packaging material dispenser during the relative rotation by controlling an alternating current variable frequency drive (VFD) of the packaging material dispenser to drive a dispenser motor, and detecting a packaging material break during the relative rotation by receiving an input signal representative of dispenser motor torque, and detecting using the input signal that the dispenser motor torque is below a work offset that offsets a torque associated with prestretching the packaging material.

Some embodiments may also include determining a torque window using the work offset and determining a torque setpoint within the torque window using a wrap force parameter, where the input signal is a first input signal, and where controlling the dispense rate further includes maintaining a substantially constant torque of the dispenser motor during at least a portion of a wrap cycle by receiving a second input signal representative of a rate of relative rotation between the packaging material dispenser and the load, and controlling a speed signal in the VFD in response to the first and second input signals to control the torque of the dispenser motor to match the torque setpoint.

Consistent with another aspect of the invention, an apparatus for wrapping a load with packaging material may include a packaging material dispenser for dispensing packaging material to the load, the packaging material dispenser including a dispenser motor driven by an alternating current variable frequency drive (VFD), a rotational drive configured to generate relative rotation between the packaging material dispenser and the load about a center of rotation, and control logic configured to control a dispense rate of the packaging material dispenser during the relative rotation to maintain a substantially constant torque for the dispenser motor while maintaining a speed of the dispenser motor within a speed window that is based at least in part on a rate of relative rotation between the packaging material dispenser and the load.

Further, in some embodiments, the control logic is configured to control the dispense rate to maintain the substantially constant torque for the dispenser motor while maintaining the speed of the dispenser motor within the speed window by receiving a first input signal representative of the rate of relative rotation between the packaging material dispenser and the load, receiving a second input signal representative of dispenser motor torque, and controlling a speed of the dispenser motor in response to the first and second input signals to control the torque of the dispenser motor to match a torque setpoint.

In some embodiments, the control logic is further configured to detect a packaging material break based upon the second input signal indicating a torque that is below a torque window. Also, in some embodiments, at least a portion of the control logic is disposed in the VFD. In some embodiments, at least a portion of the control logic is disposed in a main controller for the wrapping apparatus. Further, in some embodiments, the apparatus lacks a force sensing device for sensing tension in a web of the packaging material, and the control logic is configured to control the dispense rate to maintain the substantially constant torque for the dispenser motor while maintaining the speed of the dispenser motor within the speed window without sensing the tension in the web of the packaging material.

Some embodiments may include an apparatus that wraps a load with packaging material using a packaging material dispenser adapted for relative rotation with the load about a center of rotation and a controller that performs any of the aforementioned operations, while some embodiments may include a program product including a computer readable medium and program code configured upon execution by a controller in an apparatus that wraps a load with packaging material using a packaging material dispenser adapted for relative rotation with the load about a center of rotation, and where the program code is configured to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Embodiments consistent with the invention may utilize a VFD torque control for an AC motor used in a packaging material dispenser to control a dispense rate for the packaging material dispenser, and in many instances without utilizing a separate tension sensing device to sense the tension in a web of packaging material extending between the packaging material dispenser and the load. Prior to a further discussion of these various techniques, however, a brief discussion of various types of wrapping apparatus within which the various techniques disclosed herein may be implemented is provided.

Wrapping Apparatus Configurations

Figure 1:
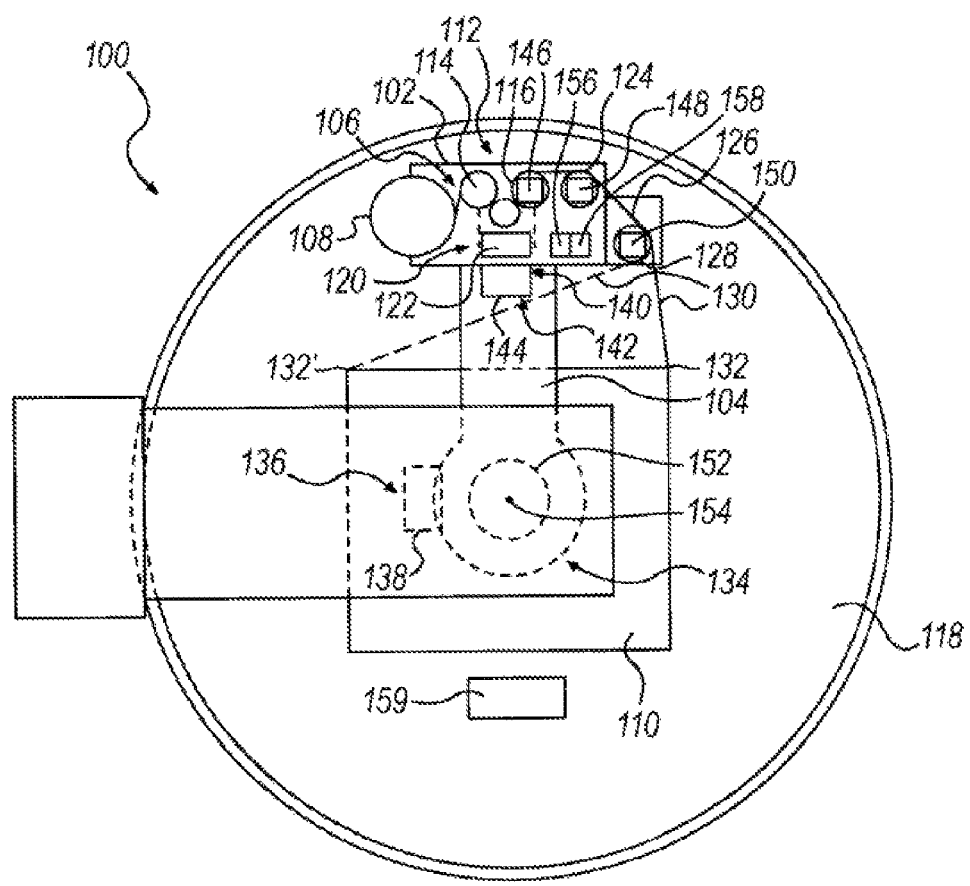
FIG. 1 shows a top view of a rotating arm-type wrapping apparatus consistent with the invention.

Various wrapping apparatus configurations may be used in various embodiments of the invention. For example, FIG. 1 illustrates a rotating arm-type wrapping apparatus 100, which includes a roll carriage or elevator 102 mounted on a rotating arm 104. Roll carriage 102 may include a packaging material dispenser 106. Packaging material dispenser 106 may be configured to dispense packaging material 108 as rotating arm 104 rotates relative to a load 110 to be wrapped. In an example embodiment, packaging material dispenser 106 may be configured to dispense stretch wrap packaging material. As used herein, stretch wrap packaging material is defined as material having a high yield coefficient to allow the material a large amount of stretch during wrapping. However, it is possible that the apparatuses and methods disclosed herein may be practiced with packaging material that will not be pre-stretched prior to application to the load. Examples of such packaging material include netting, strapping, banding, tape, etc. The invention is therefore not limited to use with stretch wrap packaging material. In addition, as used herein, the terms "packaging material," "web," "film," "film web," and "packaging material web" may be used interchangeably.

Packaging material dispenser 106 may include a pre-stretch assembly 112 configured to pre-stretch packaging material before it is applied to load 110 if pre-stretching is desired, or to dispense packaging material to load 110 without pre-stretching. Pre-stretch assembly 112 may include at least one packaging material dispensing roller, including, for example, an upstream dispensing roller 114 and a downstream dispensing roller 116. It is contemplated that pre-stretch assembly 112 may include various configurations and numbers of pre-stretch rollers, drive or driven roller and idle rollers without departing from the spirit and scope of the invention.

The terms "upstream" and "downstream," as used in this application, are intended to define positions and movement relative to the direction of flow of packaging material 108 as it moves from packaging material dispenser 106 to load 110. Movement of an object toward packaging material dispenser 106, away from load 110, and thus, against the direction of flow of packaging material 108, may be defined as "upstream." Similarly, movement of an object away from packaging material dispenser 106, toward load 110, and thus, with the flow of packaging material 108, may be defined as "downstream." Also, positions relative to load 110 (or a load support surface 118) and packaging material dispenser 106 may be described relative to the direction of packaging material flow. For example, when two pre-stretch rollers are present, the pre-stretch roller closer to packaging material dispenser 106 may be characterized as the "upstream" roller and the pre-stretch roller closer to load 110 (or load support 118) and further from packaging material dispenser 106 may be characterized as the "downstream" roller.

A packaging material drive system 120, including, for example, an electric motor 122, may be used to drive dispensing rollers 114 and 116. For example, electric motor 122 may rotate downstream dispensing roller 116. Downstream dispensing roller 116 may be operatively coupled to upstream dispensing roller 114 by a chain and sprocket assembly, such that upstream dispensing roller 114 may be driven in rotation by downstream dispensing roller 116. Other connections may be used to drive upstream roller 114 or, alternatively, a separate drive (not shown) may be provided to drive upstream roller 114. Moreover, in some embodiments the roll of packaging material 108 may be undriven and may rotate freely, while in other embodiments the roll may be driven, e.g., by biasing a surface of the roll against upstream dispensing roller 114 or another driven roller, or by driving the roll directly.

Downstream of downstream dispensing roller 116 may be provided one or more idle rollers 124, 126 that redirect the web of packaging material, with the most downstream idle roller 126 effectively providing an exit point 128 from packaging material dispenser 102, such that a portion 130 of packaging material 108 extends between exit point 128 and a contact point 132 where the packaging material engages load 110 (or alternatively contact point 132' if load 110 is rotated in a counter-clockwise direction).

Wrapping apparatus 100 also includes a relative rotation assembly 134 configured to rotate rotating arm 104, and thus, packaging material dispenser 106 mounted thereon, relative to load 110 as load 110 is supported on load support surface 118. Relative rotation assembly 134 may include a rotational drive system 136, including, for example, an electric motor 138. It is contemplated that rotational drive system 136 and packaging material drive system 120 may run independently of one another. Thus, rotation of dispensing rollers 114 and 116 may be independent of the relative rotation of packaging material dispenser 106 relative to load 110. This independence allows a length of packaging material 108 to be dispensed per a portion of relative revolution that is neither predetermined nor constant. Rather, the length may be adjusted periodically or continuously based on changing conditions. In other embodiments, however, packaging material dispenser 106 may be driven proportionally to the relative rotation, or alternatively, tension in the packaging material extending between the packaging material dispenser and the load may be used to drive the packaging material dispenser.

Wrapping apparatus 100 may further include a lift assembly 140. Lift assembly 140 may be powered by a lift drive system 142, including, for example, an electric motor 144, that may be configured to move roll carriage 102 vertically relative to load 110. Lift drive system 142 may drive roll carriage 102, and thus packaging material dispenser 106, generally in a direction parallel to an axis of rotation between the packaging material dispenser 106 and load 110 and load support surface 118. For example, for wrapping apparatus 100, lift drive system 142 may drive roll carriage 102 and packaging material dispenser 106 upwards and downwards vertically on rotating arm 104 while roll carriage 102 and packaging material dispenser 106 are rotated about load 110 by rotational drive system 136, to wrap packaging material spirally about load 110.

One or more of downstream dispensing roller 116, idle roller 124 and idle roller 126 may include a corresponding sensor 146, 148, 150 to monitor rotation of the respective roller. In particular, rollers 116, 124 and/or 126, and/or packaging material 108 dispensed thereby, may be used to monitor a dispense rate of packaging material dispenser 106, e.g., by monitoring the rotational speed of rollers 116, 124 and/or 126, the number of rotations undergone by such rollers, the amount and/or speed of packaging material dispensed by such rollers, and/or one or more performance parameters indicative of the operating state of packaging material drive system 120, including, for example, a speed of packaging material drive system 120. The monitored characteristics may also provide an indication of the amount of packaging material 108 being dispensed and wrapped onto load 110. In addition, in some embodiments a sensor, e.g., sensor 148 or 150, may be used to detect a break in the packaging material.

Wrapping apparatus 100 may also include an angle sensor 152 for determining an angular relationship between load 110 and packaging material dispenser 106 about a center of rotation 154. Angle sensor 152 may be implemented, for example, as a rotary encoder, or alternatively, using any number of alternate sensors or sensor arrays capable of providing an indication of the angular relationship and distinguishing from among multiple angles throughout the relative rotation, e.g., an array of proximity switches, optical encoders, magnetic encoders, electrical sensors, mechanical sensors, photodetectors, motion sensors, etc. The angular relationship may be represented in some embodiments in terms of degrees or fractions of degrees, while in other embodiments a lower resolution may be adequate. It will also be appreciated that an angle sensor consistent with the invention may also be disposed in other locations on wrapping apparatus 100, e.g., about the periphery or mounted on arm 104 or roll carriage 102. In addition, in some embodiments angular relationship may be represented and/or measured in units of time, based upon a known rotational speed of the load relative to the packaging material dispenser, from which a time to complete a full revolution may be derived such that segments of the revolution time would correspond to particular angular relationships. Other sensors may also be used to determine the height and/or other dimensions of a load, among other information.

Additional sensors, such as a load distance sensor 156 and/or a film angle sensor 158, may also be provided on wrapping apparatus 100. Load distance sensor 156 may be used to measure a distance from a reference point to a surface of load 110 as the load rotates relative to packaging material dispenser 106 and thereby determine a cross-sectional dimension of the load at a predetermined angular position relative to the packaging material dispenser. In one embodiment, load distance sensor 156 measures distance along a radial from center of rotation 154, and based on the known, fixed distance between the sensor and the center of rotation, the dimension of the load may be determined by subtracting the sensed distance from this fixed distance. Sensor 156 may be implemented using various types of distance sensors, e.g., a photoeye, proximity detector, laser distance measurer, ultrasonic distance measurer, electronic rangefinder, and/or any other suitable distance measuring device. Exemplary distance measuring devices may include, for example, an IFM Effector 01D100 and a Sick UM30-213118 (6036923).

Film angle sensor 158 may be used to determine a film angle for portion 130 of packaging material 108, which may be relative, for example, to a radial (not shown in FIG. 1) extending from center of rotation 154 to exit point 128 (although other reference lines may be used in the alternative). In one embodiment, film angle sensor 158 may be implemented using a distance sensor, e.g., a photoeye, proximity detector, laser distance measurer, ultrasonic distance measurer, electronic rangefinder, and/or any other suitable distance measuring device. In one embodiment, an IFM Effector 01D100 and a Sick UM30-213118 (6036923) may be used for film angle sensor 158. In other embodiments, film angle sensor 158 may be implemented mechanically, e.g., using a cantilevered or rockered follower arm having a free end that rides along the surface of portion 130 of packaging material 108 such that movement of the follower arm tracks movement of the packaging material. In still other embodiments, a film angle sensor may be implemented by a force sensor that senses force changes resulting from movement of portion 130 through a range of film angles, or a sensor array (e.g., an image sensor) that is positioned above or below the plane of portion 130 to sense an edge of the packaging material.

Wrapping apparatus 100 may also include additional components used in connection with other aspects of a wrapping operation. For example, a clamping device 159 may be used to grip the leading end of packaging material 108 between cycles. In addition, a conveyor (not shown) may be used to convey loads to and from wrapping apparatus 100. Other components commonly used on a wrapping apparatus will be appreciated by one of ordinary skill in the art having the benefit of the instant disclosure.

Moreover, as will become more apparent below, in some embodiments a number of the various sensors illustrated in FIG. 1 may be omitted from wrapping apparatus 100, particular where wrapping apparatus 100 is utilized in a lower end wrapping apparatus. In some embodiments, for example, no feedback as to load dimensions, film angles, relative rotation angles, roller speeds, load distances, or packaging material web tension may be provided, and control over dispense rate may be based principally upon the various torque control techniques disclosed hereinafter.

Figure 2:
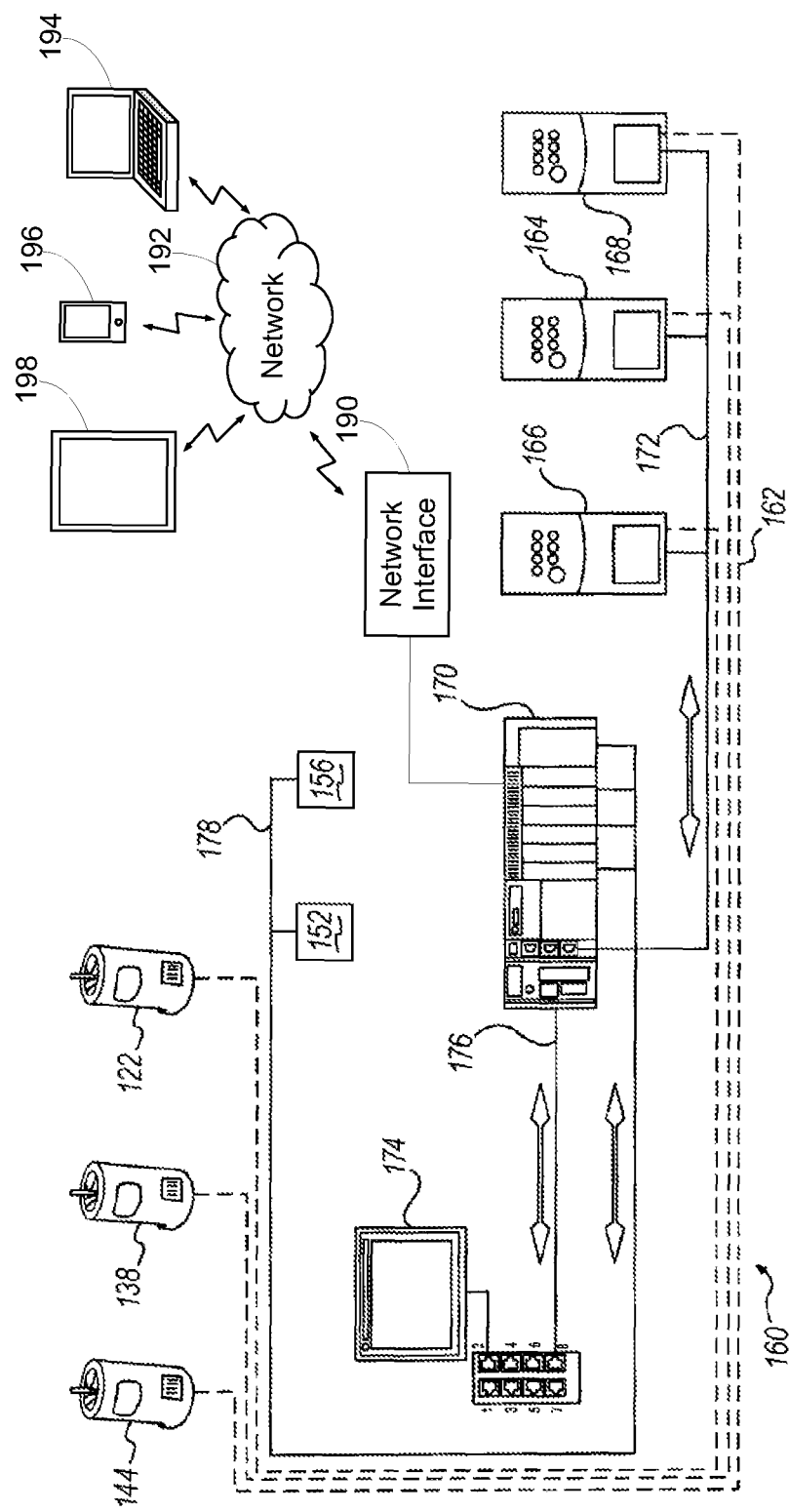
FIG. 2 is a schematic view of an example control system for use in the apparatus of FIG. 1.

An example schematic of a control system 160 for wrapping apparatus 100 is shown in FIG. 2. Motor 122 of packaging material drive system 120, motor 138 of rotational drive system 136, and motor 144 of lift drive system 142 may communicate through one or more data links 162 with a rotational drive variable frequency drive ("VFD") 164, a packaging material drive VFD 166, and a lift drive VFD 168, respectively. Rotational drive VFD 164, packaging material drive VFD 166, and lift drive VFD 168 may communicate with controller 170 through a data link 172. It should be understood that rotational drive VFD 164, packaging material drive VFD 166, and lift drive VFD 168 may produce outputs to controller 170 that controller 170 may use as indicators of rotational movement.

Controller 170 in the embodiment illustrated in FIG. 2 is a local controller that is physically co-located with the packaging material drive system 120, rotational drive system 136 and lift drive system 142. Controller 170 may include hardware components and/or software program code that allow it to receive, process, and transmit data. It is contemplated that controller 170 may be implemented as a programmable logic controller (PLC), or may otherwise operate similar to a processor in a computer system. Controller 170 may communicate with an operator interface 174 via a data link 176. Operator interface 174 may include a display or screen and controls that provide an operator with a way to monitor, program, and operate wrapping apparatus 100. For example, an operator may use operator interface 174 to enter or change predetermined and/or desired settings and values, or to start, stop, or pause the wrapping cycle. Controller 170 may also communicate with one or more sensors, e.g., sensors 152 and 156, among others, through a data link 178 to allow controller 170 to receive feedback and/or performance-related data during wrapping, such as roller and/or drive rotation speeds, load dimensional data, etc. It is contemplated that data links 162, 172, 176, and 178 may include any suitable wired and/or wireless communications media known in the art.

For the purposes of the invention, controller 170 may represent practically any type of computer, computer system, controller, logic controller, drive controller, or other programmable electronic device, and may in some embodiments be implemented using one or more networked computers or other electronic devices, whether located locally or remotely with respect to the various drive systems 120, 136 and 142 of wrapping apparatus 100 as depicted in FIG. 1. The functionality of controller 170 may also be distributed among multiple electronic devices (e.g., distributed between a machine controller and a VFD drive) in some embodiments.

Controller 170 typically includes a central processing unit including at least one microprocessor coupled to a memory, which may represent the random access memory (RAM) devices comprising the main storage of controller 170, as well as any supplemental levels of memory, e.g., cache memories, non-volatile or backup memories (e.g., programmable or flash memories), read-only memories, etc. In addition, the memory may be considered to include memory storage physically located elsewhere in controller 170, e.g., any cache memory in a processor in CPU 52, as well as any storage capacity used as a virtual memory, e.g., as stored on a mass storage device or on another computer or electronic device coupled to controller 170. Controller 170 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 170 may include an interface 190 with one or more networks 192 (e.g., a LAN, a WAN, a wireless network, and/or the Internet, among others) to permit the communication of information to the components in wrapping apparatus 100 as well as with other computers and electronic devices, e.g. computers such as a desktop computer or laptop computer 194, mobile devices such as a mobile phone 196 or tablet 198, multi-user computers such as servers or cloud resources, etc. Controller 170 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 170, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by controller 170. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In the discussion hereinafter, the hardware and software used to control wrapping apparatus 100 is assumed to be incorporated wholly within components that are local to wrapping apparatus 100 illustrated in FIGS. 1-2, e.g., within components 162-178 described above. It will be appreciated, however, that in other embodiments, at least a portion of the functionality incorporated into a wrapping apparatus may be implemented in hardware and/or software that is external to the aforementioned components. For example, in some embodiments, some user interaction may be performed using an external device such as a networked computer or mobile device, with the external device converting user or other input into control variables that are used to control a wrapping operation. In other embodiments, user interaction may be implemented using a web-type interface, and the conversion of user input may be performed by a server or a local controller for the wrapping apparatus, and thus external to a networked computer or mobile device. In still other embodiments, a central server may be coupled to multiple wrapping stations to control the wrapping of loads at the different stations. As such, the operations of receiving user or other input, converting the input into control variables for controlling a wrap operation, initiating and implementing a wrap operation based upon the control variables, providing feedback to a user, etc., may be implemented by various local and/or remote components and combinations thereof in different embodiments. In some embodiments, for example, an external device such as a mobile device, a networked computer, a server, a cloud service, etc. may generate a wrap model that defines the control variables for controlling a wrap operation for a particular load, and that wrap model may then be communicated to a wrapping apparatus and used by a local controller therefor to control a dispense rate during a wrap operation. As such, the invention is not limited to the particular allocation of functionality described herein.

Figure 3:
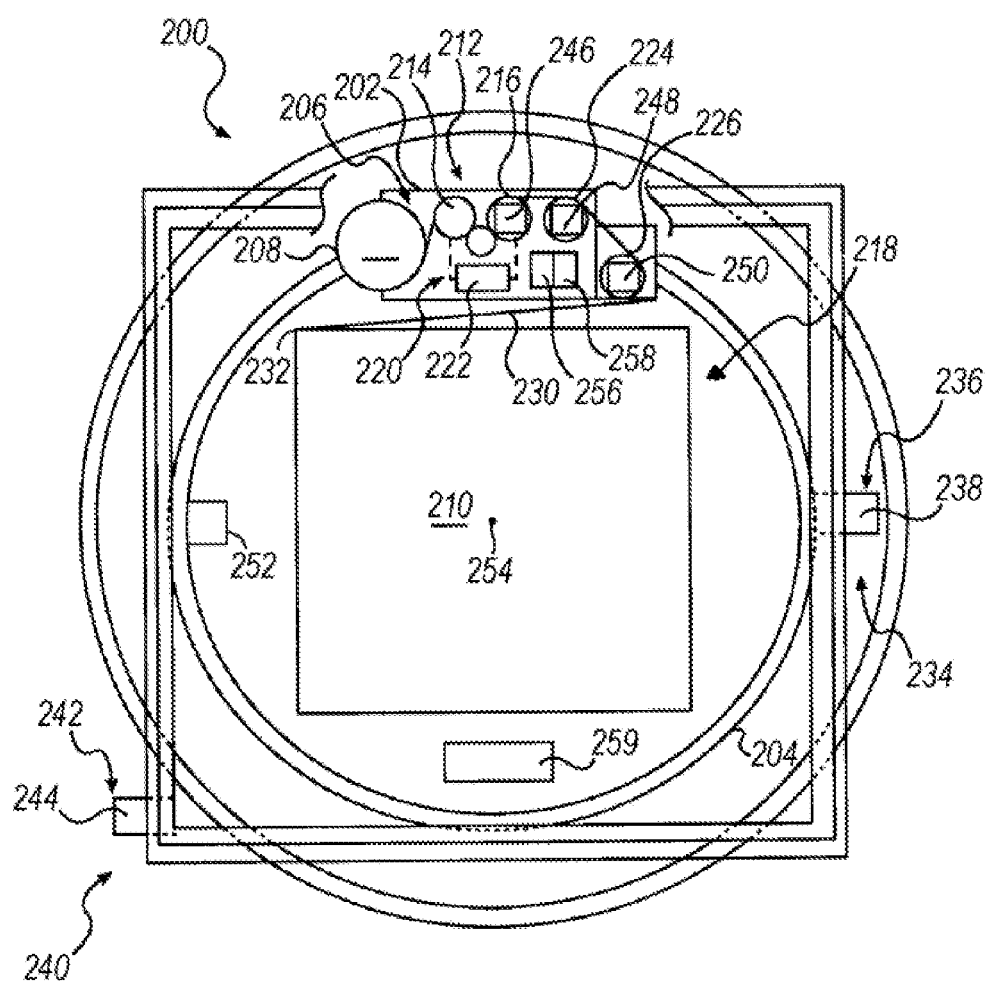
FIG. 3 shows a top view of a rotating ring-type wrapping apparatus consistent with the invention.

Now turning to FIG. 3, a rotating ring-type wrapping apparatus 200 is illustrated. Wrapping apparatus 200 may include elements similar to those shown in relation to wrapping apparatus 100 of FIG. 1, including, for example, a roll carriage or elevator 202 including a packaging material dispenser 206 configured to dispense packaging material 208 during relative rotation between roll carriage 202 and a load 210 disposed on a load support 218. However, a rotating ring 204 is used in wrapping apparatus 200 in place of rotating arm 104 of wrapping apparatus 100. In many other respects, however, wrapping apparatus 200 may operate in a manner similar to that described above with respect to wrapping apparatus 100.

Packaging material dispenser 206 may include a pre-stretch assembly 212 including an upstream dispensing roller 214 and a downstream dispensing roller 216, and a packaging material drive system 220, including, for example, an electric motor 222, may be used to drive dispensing rollers 214 and 216. Downstream of downstream dispensing roller 216 may be provided one or more idle rollers 224, 226, with the most downstream idle roller 226 effectively providing an exit point 228 from packaging material dispenser 206, such that a portion 230 of packaging material 208 extends between exit point 228 and a contact point 232 where the packaging material engages load 210.

Wrapping apparatus 200 also includes a relative rotation assembly 234 configured to rotate rotating ring 204, and thus, packaging material dispenser 206 mounted thereon, relative to load 210 as load 210 is supported on load support surface 218. Relative rotation assembly 234 may include a rotational drive system 236, including, for example, an electric motor 238. Wrapping apparatus 200 may further include a lift assembly 240, which may be powered by a lift drive system 242, including, for example, an electric motor 244, that may be configured to move rotating ring 204 and roll carriage 202 vertically relative to load 210.

In addition, similar to wrapping apparatus 100 of FIG. 1, wrapping apparatus 200 may optionally include sensors 246, 248, 250 on one or more of downstream dispensing roller 216, idle roller 224 and idle roller 226. Furthermore, an angle sensor 252 may be provided for determining an angular relationship between load 210 and packaging material dispenser 206 about a center of rotation 254, and in some embodiments, one or both of a load distance sensor 256 and a film angle sensor 258 may also be provided. Sensor 252 may be positioned proximate center of rotation 254, or alternatively, may be positioned at other locations, such as proximate rotating ring 204. Wrapping apparatus 200 may also include additional components used in connection with other aspects of a wrapping operation, e.g., a clamping device 259 may be used to grip the leading end of packaging material 208 between cycles. Any or all of the aforementioned sensors may also be omitted in other embodiments.

Figure 4:
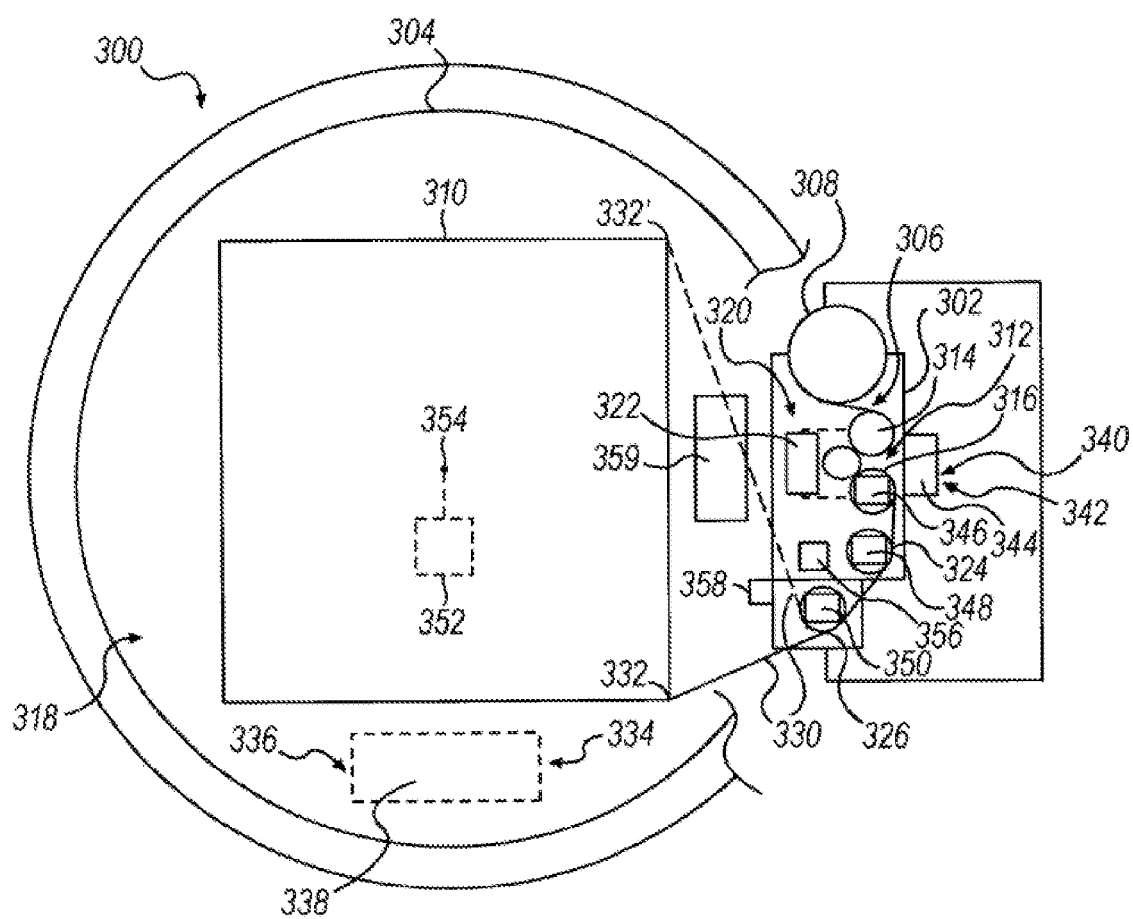
FIG. 4 shows a top view of a turntable-type wrapping apparatus consistent with the invention.

FIG. 4 likewise shows a turntable-type wrapping apparatus 300, which may also include elements similar to those shown in relation to wrapping apparatus 100 of FIG. 1. However, instead of a roll carriage or elevator 102 that rotates around a fixed load 110 using a rotating arm 104, as in FIG. 1, wrapping apparatus 300 includes a rotating turntable 304 functioning as a load support 318 and configured to rotate load 310 about a center of rotation 354 (through which projects an axis of rotation that is perpendicular to the view illustrated in FIG. 4) while a packaging material dispenser 306 disposed on a roll carriage or elevator 302 remains in a fixed location about center of rotation 354 while dispensing packaging material 308. In many other respects, however, wrapping apparatus 300 may operate in a manner similar to that described above with respect to wrapping apparatus 100.

Packaging material dispenser 306 may include a pre-stretch assembly 312 including an upstream dispensing roller 314 and a downstream dispensing roller 316, and a packaging material drive system 320, including, for example, an electric motor 322, may be used to drive dispensing rollers 314 and 316, and downstream of downstream dispensing roller 316 may be provided one or more idle rollers 324, 326, with the most downstream idle roller 326 effectively providing an exit point 328 from packaging material dispenser 306, such that a portion 330 of packaging material 308 extends between exit point 328 and a contact point 332 (or alternatively contact point 332' if load 310 is rotated in a counter-clockwise direction) where the packaging material engages load 310.

Wrapping apparatus 300 also includes a relative rotation assembly 334 configured to rotate turntable 304, and thus, load 310 supported thereon, relative to packaging material dispenser 306. Relative rotation assembly 334 may include a rotational drive system 336, including, for example, an electric motor 338. Wrapping apparatus 300 may further include a lift assembly 340, which may be powered by a lift drive system 342, including, for example, an electric motor 344, that may be configured to move roll carriage or elevator 302 and packaging material dispenser 306 vertically relative to load 310.

In addition, similar to wrapping apparatus 100 of FIG. 1, wrapping apparatus 300 may include sensors 346, 348, 350 on one or more of downstream dispensing roller 316, idle roller 324 and idle roller 326. Furthermore, an angle sensor 352 may be provided for determining an angular relationship between load 310 and packaging material dispenser 306 about a center of rotation 354, and in some embodiments, one or both of a load distance sensor 356 and a film angle sensor 358 may also be provided. Sensor 352 may be positioned proximate center of rotation 354, or alternatively, may be positioned at other locations, such as proximate the edge of turntable 304. Wrapping apparatus 300 may also include additional components used in connection with other aspects of a wrapping operation, e.g., a clamping device 359 may be used to grip the leading end of packaging material 308 between cycles. Any or all of the aforementioned sensors may also be omitted in other embodiments.

Each of wrapping apparatus 200 of FIG. 3 and wrapping apparatus 300 of FIG. 4 may also include a controller (not shown) similar to controller 170 of FIG. 2, and receive signals from one or more of the aforementioned sensors and control packaging material drive system 220, 320 during relative rotation between load 210, 310 and packaging material dispenser 206, 306.

During a typical wrapping operation with any of the example wrapping apparatuses, a clamping device, e.g., as known in the art, may be used to position a leading edge of the packaging material on the load such that when relative rotation between the load and the packaging material dispenser is initiated, the packaging material will be dispensed from the packaging material dispenser and wrapped around the load. Alternatively, the leading edge of the packaging material may be positioned on the load manually.

In addition, where prestretching is used, the packaging material is stretched prior to being conveyed to the load. Thereafter, wrapping continues while a lift assembly controls the height of the packaging material so that the packaging material is wrapped in a spiral manner around the load from the base of the load to the top. Multiple layers of packaging material may be wrapped around the load over multiple passes to increase containment force, and once the desired amount of packaging material is dispensed, the packaging material is automatically or manually severed to complete the wrap.

Those skilled in the art will recognize that the example environments illustrated in FIGS. 1-4 are not intended to limit the present invention. Indeed, those skilled in the art will recognize that other alternative environments may be used without departing from the scope of the invention.

Dispenser VFD Torque Control

As discussed above, stretch wrapping machines provide relative rotation between a packaging material dispenser and a typically non-cylindrical load either by driving the packaging material dispenser around a stationary load or rotating the load on a turntable. Upon relative rotation, packaging material is dispensed and applied to the load. The amount of force, or pull, that the packaging material applies on the load generally determines how tightly and securely the load is wrapped. Conventionally, this force has been controlled by use of packaging material force sensing devices such as load cells, spring loaded dancer bars in conjunction with hall effect sensors, etc., as feedback devices. However, errors due to syncing between demand rate changes and supply response, as well as processing delays, may further exacerbate demand supply responses. Moreover, force sensing devices also add cost and maintenance complexity, which can be prohibitive for some stretch wrapping applications. Furthermore, despite a general desirability of AC motors over DC motors for many stretch wrapping applications, principally for cost and maintenance advantages, control of AC motors to appropriately moderate the force the packaging material applies on a load during wrapping has been difficult to achieve.

Consistent with some embodiments of the invention, on the other hand, the dispense rate of a packaging material dispenser may be controlled using an alternating current (AC) variable frequency drive (VFD) to maintain a substantially constant torque for a dispenser motor of the packaging material dispenser while maintaining a speed of the dispenser motor within a speed window that is based at least in part on a rate of relative rotation between the packaging material dispenser and the load. As will become more apparent below, in some embodiments the inputs available on AC VFD drives may be used directly or as surrogates for data that is suitable for use in calculating and commanding a packaging material dispense speed that will produce a desired containment force on a load.

Figure 5:
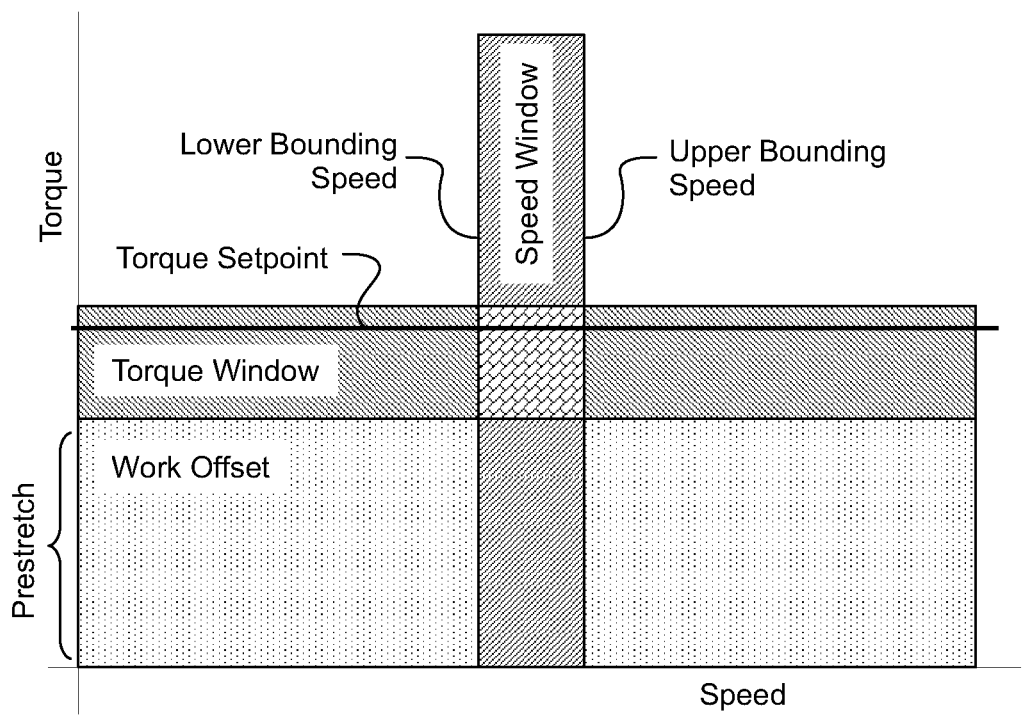
FIG. 5 illustrates example torque and speed windows suitable for use in the wrapping apparatus of FIGS. 1-2 and consistent with some embodiments of the invention.

In some embodiments, for example, the work associated with maintaining the desired tension in the packaging material between the packaging material dispenser and the load may be effectively isolated from the other components of the work performed by the dispenser motor through the use of a work offset, e.g., as illustrated in FIG. 5. In particular, it has been found that a substantial portion of the overall work of a dispenser motor (thus the overall torque) in many wrapping apparatus designs is associated with prestretching the packaging material. This aspect of the work is substantially constant for a given packaging material at a given prestretch ratio, and is substantially greater in magnitude than the amount of work associated with maintaining a tension in the packaging material between the packaging material dispenser and the load. As a result, this aspect of the work is relatively insensitive to the speed of the dispenser motor. In contrast, the work associated with the tension, while far smaller in magnitude, is highly sensitive to the speed of the dispenser motor due to the fact that the demand rate of the load during the relative rotation varies considerably during relative rotation, rapidly transitioning between maximum and minimum rates as the packaging material is wrapped around each corner of the load. As a result, maintaining a substantially constant tension in a web of packaging material generally requires a relatively large variation in dispenser motor speed to account for a relatively smaller portion of the overall work, and thus the overall torque, required of the dispenser motor.

The amount of the work offset may be based at least in part on the packaging material type and/or thickness, as it will be appreciated that the amount of work associated with prestretching the packaging material will be based in part on the characteristics of the packaging material itself. In some embodiments, packaging material gauge or thickness may be considered to be a suitable surrogate for the work offset, while in other embodiments it may be desirable to utilize a packaging material type (e.g., brand, model and/or material composition, among others) in connection with or in lieu of the packaging material thickness as a surrogate for the work offset. Moreover, in embodiments where the amount of prestretch is controllable, the prestretch ratio may also be utilized to determine the work offset. The work offset may be determined empirically in some embodiments, and may be determined, for example, utilizing a lookup table based upon different packaging material thicknesses, types and/or prestretch ratios in some embodiments. However, it will also be appreciated that the invention is not so limited, as other manners of determining a work offset will be appreciated by those of those of ordinary skill having the benefit of the instant disclosure. For example, one or more load characteristics, e.g., size, dimensions, types, etc., may also impact the work offset in some embodiments.

In the illustrated embodiment, the work offset defines the lower bound of a torque window as illustrated in FIG. 5, within which a torque setpoint may be selected. The size of the torque window, and thus the range of suitable torque setpoints, is based upon the range of suitable packaging material tensions that may be supported by a wrapping apparatus. In one embodiment discussed in greater detail below, for example, an operator may be permitted to select a wrap force parameter, e.g., a packaging material tension parameter, either directly (e.g., through input of a tension in pounds of force, selection of a numerical value within a range of wrap force settings (e.g., between 1-15), etc.), or through the use of a wrap profile builder (e.g., to select a desired containment force through selection of one or more load characteristics such as size, stability, regularity, axial load variations, degree inboard of pallet, load contents, weight, etc.). The wrap force parameter may be associated with a desired containment force further based upon packaging material characteristics in some embodiments, as well as the number of layers of packaging material to be dispensed to the load during the wrap cycle such that, for example, in response to input of a desired containment force, a suitable wrap force parameter may be determined and utilized to determine a torque setpoint.

The upper bound of the torque window may therefore be set in some embodiments based upon the minimum packaging material tension for a particular wrapping apparatus, such that various torque setpoints corresponding to packaging material tensions may be selected within the torque window throughout the range of acceptable packaging material tensions. It will be appreciated that at minimum tension, the speed of the dispenser motor is relatively higher to offset the pull exerted by the load during the relative rotation, resulting in a positive torque for the dispenser motor. At maximum tension, however, the dispenser motor rotates at a relatively slower rate to resist the pull exerted by the load during the relative rotation, resulting in a negative torque.

In operation, the torque setpoint may be used in a torque control algorithm for the dispenser motor (e.g., as implemented within a VFD), and may receive feedback from the dispenser motor representative of the torque of the dispenser motor. In some embodiments, for example, the feedback may be provided by way of an operational current signal from the dispenser motor, and the torque control algorithm may determine a torque that corresponds to the operational current and accordingly adjust the speed of the dispenser motor (e.g., via a speed command or speed signal) to increase (via a speed decrease) or decrease (via a speed increase) the torque and thereby maintain the torque substantially at the torque setpoint. The torque setpoint may be converted to a corresponding current, the operational current may be converted to torque, or conversions to other suitable units may be used in various embodiments.

In addition to controlling the dispenser motor to maintain a substantially constant torque using the torque setpoint, however, embodiments consistent with the invention may also establish a speed window that is based at least in part on a rate of relative rotation between the packaging material dispenser and the load, e.g., the rotational speed of a turntable, rotating arm or rotating ring. In this regard, in some embodiments the relative rotation rate operates as an automatic gain adjustment for the torque control algorithm.

As illustrated in FIG. 5, for example, a speed window may be established to further constrain the torque control algorithm to limit or hold the commanded speed to be between upper and lower bounding speeds associated with the speed window. The speed window may be determined based in part on the relative rotation rate or speed, which in some embodiments may be a dynamically determined using a signal output by an encoder or other sensor, or a sensed torque or another signal output by a rotational drive that controls the relative revolution. The relative rotation rate or speed may also be determined via a calculated value. For example, a calculated value may be provided as an input signal when a particular wrapping apparatus has a single set speed or a speed control that varies the wrapping speed and controls to the controlled speed input (e.g., when the wrapping apparatus has a 12 RPM turntable speed or is set to wrap at 10 RPM, no sensing of actual relative rotation speed may be needed in some embodiments).

It will be appreciated that given a particular load rotated at a particular relative rotation speed, the demand rate of the load will vary within a particular range, and as such, the speed window may be used to constrain the controllable speed of the dispenser motor to be within the speed window. Doing so restricts the torque control algorithm from adjusting the speed beyond the speed window and overcorrecting for torque variations (thereby stabilizing the torque control algorithm to the frequent speed changes associated with wrapping a rotating rectangular or other non-cylindrical load).

Thus, in some embodiments, if a speed command or signal determined based upon the torque setpoint is found to be outside of the speed window (e.g., greater than the upper bounding speed of the speed window or less than the lower bounding speed of the speed window), the torque control algorithm may override the speed command or signal to match the relevant boundary of the speed window (e.g., the upper bounding speed if too high, or the lower bounding speed if too low).

The width (and thus bounds) of the speed window may be based, in some embodiments, on a standard load size (e.g., a 40"×48" standard pallet size), whereby the speed window, and thus the range of speeds, is maintained within the speeds corresponding to the range of demand rates for the standard load size. In some embodiments, the width may be fixed, and in other embodiments, the width may be proportional to the rate of relative rotation. In other embodiments, however, additional factors may also be used to control the width of the speed window, e.g., various load characteristics that control the range of demand rates expected to be exhibited by the load during wrapping. Such load characteristics may include, for example, a load size or dimension, a load girth, a relative load size (e.g., small, medium, large), a load shape, or any other characteristic of a load that impacts the range of demand rates for the load.

Figure 6:
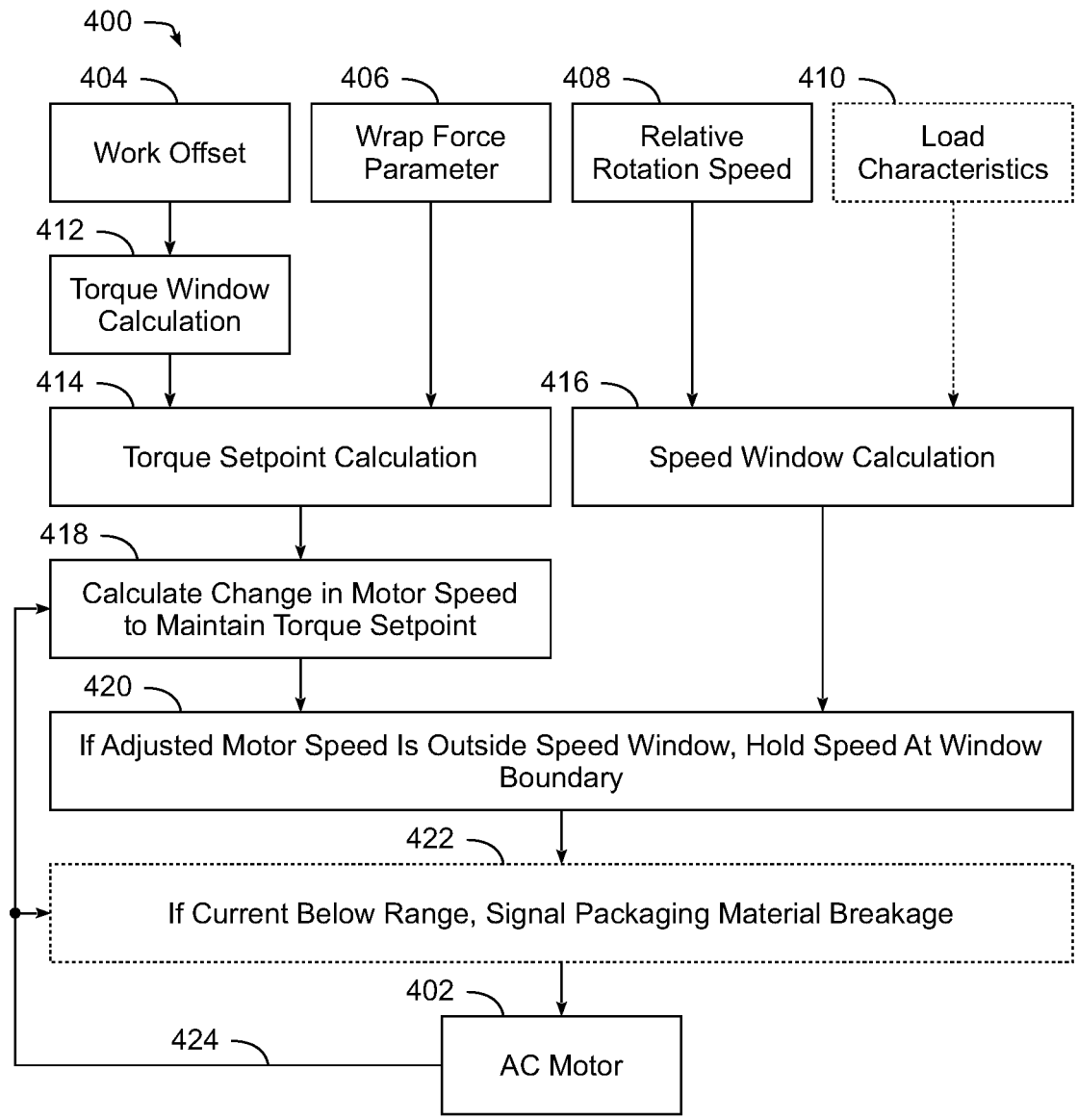
FIG. 6 illustrates an example implementation of a torque control algorithm suitable for use in the wrapping apparatus of FIGS. 1-2 and consistent with some embodiments of the invention.

FIG. 6 illustrates an example torque control algorithm 400 suitable for implementation within control logic associated with a wrapping apparatus such as any of wrapping apparatus 100, 200, 300. The control logic may be disposed in the VFD for the dispenser motor in some embodiments, while in other embodiments, the control logic may be implemented separate from the VFD, or may be distributed among multiple electronic components, e.g., where portions of the algorithm are implemented in a main controller for the wrapping apparatus, the VFD, the dispenser motor and/or control logic remote and/or external to the wrapping apparatus. As such, the invention is not limited to a torque control algorithm implemented exclusively within a VFD.

Torque control algorithm 400 controls the speed of an AC dispenser motor 402 in response to inputs 404, 406, 408, and optionally input 410. Input 404 is a work offset input that specifies a work offset, which as noted above, may be used to determine or calculate a torque window (block 412). The work offset input may be based on one or more packaging material characteristics, e.g., a packaging material thickness or gauge, a packaging material type and/or a prestretch parameter (such as a prestretch ratio), and in some embodiments may be determined using a lookup table. One or more load characteristics, e.g., size, dimensions, types, etc., may also impact the work offset in some embodiments.

Input 406 is a wrap force parameter that specifies a wrap force, e.g., using a tension setting, a payout percentage, etc., and as noted above, the wrap force parameter is combined with the calculated torque window to determine or calculate a torque setpoint (block 414). It will be appreciated that in some embodiments, the torque setpoint may be calculated prior to performing the wrap cycle, and may be a static variable throughout the wrap cycle. In other embodiments, however, the torque setpoint may be calculated and/or updated dynamically during the wrap cycle.

Input 408 is a relative rotation rate or speed input, which as noted above may be determined based upon an encoder signal, a torque signal from the rotational drive, other sensed data indicative of the relative rotation rate, a calculated value based upon a setting or a default relative rotation rate for the wrapping apparatus, or in other manners that will be appreciated by those of ordinary skill having the benefit of the instant disclosure. Input 408 is used to determine or calculate a speed window (block 416), which limits the range of commanded dispenser motor speeds between upper and lower bounding speeds.

As noted above, in some embodiments the characteristics of a standard load (e.g., a 40"×48" load) may be used in the determination of a speed window, whereby the upper and lower bounding speeds of the speed window are determined solely based upon the current relative rotation rate or speed (e.g., using a formula or lookup table). In other embodiments, however, one or more load characteristics, e.g., as represented by input 410, may also be considered in the determination of a speed window, as discussed in greater detail above.

Blocks 418-422 represent a control loop for torque control algorithm 400, which may be performed during a wrap cycle to control the dispense rate of the packaging material dispenser during the relative rotation between the packaging material dispenser and the load. Block 418 periodically calculates a change in motor speed to maintain the torque setpoint calculated in block 414. A current torque of the AC motor, as provided by signal 424, may be fed back to block

418 to perform the calculation. In some embodiments, signal 424 may be a current signal, although other signals representing the current torque or load on the AC motor may be used in other embodiments. It will be appreciated that an increase in motor speed will generally result in a decrease in torque because packaging material will be dispensed at a faster rate relative to the rate of relative rotation between the packaging material dispenser and the load (which reduces the tension in the web of packaging material), while a decrease in motor speed will generally result in an increase in torque.

Block 420 next determines whether the adjusted motor speed (based on the calculated change in motor speed) is outside the speed window calculated in block 416. If not, the adjusted motor speed is used to drive the AC motor, e.g., by setting a speed command or signal for the AC motor in the VFD to drive the AC motor to rotate at the adjusted motor speed. If outside the speed window, however, the speed used to drive the AC motor is set to the appropriate upper (if too fast) or lower (if too slow) bounding speed to thereby hold or maintain the speed within the speed window.

In addition, as illustrated in block 422, it may also be desirable in some embodiments to detect film breaks (breaks in the web of packaging material) within the control loop executed during the wrap cycle. It has been found, in particular, that film breaks may be detected in some embodiments using some of the same inputs used in the torque control algorithm, e.g., by comparing the torque output by the AC motor (e.g., represented by a current provided by signal 424) to a threshold or range below which is indicative of a film break. For example, in some embodiments, the threshold or range may be associated with the work offset, since a torque below the work offset indicates that less torque is being generated than is associated with prestretching the packaging material, which as noted above is a torque that is substantially constant for a given packaging material and prestretch ratio, and thus does not vary based upon the tension in the web of packaging material.

In some embodiments a current or torque below a predetermined range (e.g., corresponding to the work offset) may trigger a packaging material breakage detection, while in other embodiments, a trigger may only be asserted if the current or torque is below the predetermined range for some predetermined duration (which may reduce the likelihood of a false positive if a momentary dip in torque occurs). Signaling a packaging material breakage may, for example, cause the wrapping apparatus to halt the wrap cycle, and in some instances, return to a home position.

It will be appreciated that film break detection as described herein may be used in connection with other packaging material dispense rate control algorithms, so the invention is not limited to the use of the herein-described film break detection functionality in combination with the specific torque control algorithm described herein.

It will also be appreciated that both the torque control algorithm and the film break detection functionality described herein may be utilized in a wrapping apparatus without any separate sensor, dancer or other external device for measuring the tension or force applied to the packaging material. However, it will also be appreciated that the invention is not so limited, so the herein-described techniques may be used in a wrapping apparatus including a sensor, dancer or other external device for measuring tension or force in other embodiments.

It will further be appreciated that inputs 404-410 may be supplied in various manners in different embodiments, e.g., via input through an operator interface that is local or remote from the wrapping apparatus, via a database lookup, via sensor measurements, via machine calculations, etc. Moreover, in some embodiments, at least some of the inputs may be entered manually or otherwise as direct inputs via an operator interface, e.g., using buttons, dials, knobs, switches, a touchscreen, etc., while in other embodiments at least some of the inputs may be determined indirectly, e.g., using wrap profiles (e.g., as may be created through a graphical wrap profile builder), using packaging material profiles, or in other manners that will be apparent to those of ordinary skill having the benefit of the instant disclosure.

In one example embodiment, for example, prior to a wrap cycle an operator may select a tension (e.g., a value between 1-15) through an operator interface (e.g., directly or through a wrap profile builder) to select a wrap force parameter to deliver a desired overall containment force at the load. The operator may also select and enter a packaging material thickness or gauge through the operator interface. A work offset may be determined from the selected packaging material thickness or gauge (e.g., using a lookup table), and a torque setpoint may then be determined above that work offset based upon the selected tension.

Then, the wrap cycle may be initiated, and relative rotation speed may be sensed or calculated during the wrap cycle for use in determining the speed window. The operational current of the dispenser motor may then be sensed during the wrap cycle and used in combination with the torque setpoint to control the speed of the dispenser motor to provide a torque that substantially matches the torque setpoint, with the speed window used to constrain the speed of the dispenser motor between upper and lower bounding speeds. In addition, in some instances load characteristics (e.g., as provided through a wrap profile) may be used to adjust the speed window to account for non-standard characteristics of the load.

During the wrap cycle, the VFD drive may thus adapt and self-monitor changes in packaging material demand by continuously monitoring the above dynamic inputs, and in some instances, do so without any external or additional sensors to determine force changes. In addition, in some embodiments, this torque-based control may only be active for a portion of a wrap cycle, e.g., where it is desirable to wrap with a lower force at the beginning and end of a wrap cycle. As another alternative, torque-based control may also be used in some embodiments at the beginning and end of a wrap cycle, but with the wrap force parameter temporarily decreased.

Therefore, it will be appreciated that embodiments consistent with the invention may provide a manner for driving an AC dispenser motor controlled by a VFD at a substantially constant torque when wrapping prestreched packaging material around non-cylindrical loads, in part by maintaining the speed of the AC dispenser motor within a speed window that is determined at least in part on the rate of relative rotation between a packaging material dispenser and a load. It will also be appreciated that implementation of the various techniques described herein in whole or in part within a VFD and/or a dispenser motor would be well within the abilities of those of ordinary skill having the benefit of the instant disclosure.

Other embodiments will be apparent to those skilled in the art from consideration of the specification and practice of the present invention. Therefore the invention lies in the claims set forth hereinafter.

What is claimed is:

1. A method of wrapping a non-cylindrical load with packaging material using a wrapping apparatus of a type including a packaging material dispenser for dispensing packaging material to the load, the method comprising:

generating relative rotation between the packaging material dispenser and the load about a center of rotation; and controlling a dispense rate of the packaging material dispenser during the relative rotation using an alternating current variable frequency drive (VFD) to maintain a substantially constant torque for a dispenser motor of the packaging material dispenser while maintaining a speed of the dispenser motor within a speed window that is based at least in part on a rate of relative rotation between the packaging material dispenser and the load, wherein controlling the dispense rate to maintain the substantially constant torque for the dispenser motor while maintaining the speed of the dispenser motor within the speed window includes:

receiving a first input signal representative of the rate of relative rotation between the packaging material dispenser and the load;

receiving a second input signal representative of dispenser motor torque; and controlling a speed of the dispenser motor in response to the first and second input signals to control the torque of the dispenser motor to match a torque setpoint.

2. The method of claim 1, further comprising determining the torque setpoint by:

determining a torque window using a work offset; and determining the torque setpoint within the torque window using a wrap force parameter.

3. The method of claim 2, wherein the packaging material dispenser prestretches the packaging material, and wherein the work offset offsets a torque associated with prestretching the packaging material.

4. The method of claim 2, wherein the work offset varies as a function of packaging material thickness and/or packaging material type.

5. The method of claim 2, further comprising determining the work offset in response to input of a packaging material thickness and/or a packaging material type.

6. The method of claim 2, wherein the wrap force parameter is a packaging material tension parameter.

7. The method of claim 2, further comprising determining the wrap force parameter in response to input of a packaging material tension.

8. The method of claim 2, further comprising determining the wrap force parameter in response to input of a desired containment force for the load.

9. The method of claim 2, further comprising determining the wrap force parameter in response to input of one or more characteristics of the load.

10. The method of claim 1, wherein receiving the first input signal includes receiving the first input signal from a rotational drive that generates the relative rotation.

11. The method of claim 1, wherein receiving the first input signal includes receiving the first input signal from an encoder that senses the relative rotation.

12. The method of claim 1, wherein receiving the first input signal includes calculating a relative rotation speed.

13. The method of claim 1, wherein controlling the dispense rate to maintain the substantially constant torque for the dispenser motor while maintaining the speed of the dispenser motor within the speed window further includes:

determining the speed window using the first input signal; and holding a speed signal in the VFD within the speed window.

14. The method of claim 13, wherein determining the speed window includes determining the speed window further using a load characteristic.

15. The method of claim 14, further comprising determining the load characteristic in response to input of a load size or a load dimension.

16. The method of claim 14, wherein determining the speed window further including the load characteristic includes controlling a width of the speed window based at least in part on the load characteristic.

17. The method of claim 13, wherein holding the speed signal in the VFD includes, in response to determining that an adjusted speed signal determined to maintain the substantially constant torque for the dispenser motor is outside of the speed window, setting the speed signal to a bounding speed of the speed window.

18. The method of claim 1, wherein the second input signal is a current signal.

19. The method of claim 1, further comprising detecting a packaging material break using the second input signal.

20. The method of claim 19, wherein detecting the packaging material break includes detecting the packaging material break based upon the second input signal indicating a torque that is below a torque window.

21. The method of claim 20, wherein detecting the packaging material break includes detecting the packaging material break based upon the second input signal indicating a torque that is below the torque window for a predetermined duration.

22. The method of claim 1, wherein controlling the dispense rate to maintain the substantially constant torque for the dispenser motor while maintaining the speed of the dispenser motor within the speed window is performed without sensing a tension in a web of the packaging material.

23. The method of claim 1, wherein the dispenser motor is an alternating current (AC) motor.

24. A method of wrapping a load with packaging material using a wrapping apparatus of a type including a packaging material dispenser for dispensing packaging material to the load, the method comprising:

generating relative rotation between the packaging material dispenser and the load about a center of rotation;

controlling a dispense rate of the packaging material dispenser during the relative rotation by controlling an alternating current variable frequency drive (VFD) of the packaging material dispenser to drive a dispenser motor; and detecting a packaging material break during the relative rotation by:

receiving an input signal representative of dispenser motor torque; and detecting using the input signal that the dispenser motor torque is below a work offset that offsets a torque associated with prestretching the packaging material.

25. The method of claim 24, further comprising determining a torque window using the work offset and determining a torque setpoint within the torque window using a wrap force parameter, wherein the input signal is a first input signal, and wherein controlling the dispense rate further includes maintaining a substantially constant torque of the dispenser motor during at least a portion of a wrap cycle by:

receiving a second input signal representative of a rate of relative rotation between the packaging material dispenser and the load; and controlling a speed signal in the VFD in response to the first and second input signals to control the torque of the dispenser motor to match the torque setpoint.

26. An apparatus for wrapping a load with packaging material, the apparatus comprising:
a packaging material dispenser for dispensing packaging material to the load, the packaging material dispenser including a dispenser motor driven by an alternating current variable frequency drive (VFD);
a rotational drive configured to generate relative rotation between the packaging material dispenser and the load about a center of rotation; and
control logic configured to control a dispense rate of the packaging material dispenser during the relative rotation to maintain a substantially constant torque for the dispenser motor while maintaining a speed of the dispenser motor within a speed window that is based at least in part on a rate of relative rotation between the packaging material dispenser and the load, wherein the control logic is configured to control the dispense rate to maintain the substantially constant torque for the dispenser motor while maintaining the speed of the dispenser motor within the speed window by:
receiving a first input signal representative of the rate of relative rotation between the packaging material dispenser and the load;
receiving a second input signal representative of dispenser motor torque; and
controlling a speed of the dispenser motor in response to the first and second input signals to control the torque of the dispenser motor to match a torque setpoint.

27. The apparatus of claim 26, wherein the control logic is further configured to detect a packaging material break based upon the second input signal indicating a torque that is below a torque window.

28. The apparatus of claim 26, wherein at least a portion of the control logic is disposed in the VFD.

29. The apparatus of claim 26, wherein at least a portion of the control logic is disposed in a main controller for the wrapping apparatus.

30. The apparatus of claim 26, wherein the apparatus lacks a force sensing device for sensing tension in a web of the packaging material, and wherein the control logic is configured to control the dispense rate to maintain the substantially constant torque for the dispenser motor while maintaining the speed of the dispenser motor within the speed window without sensing the tension in the web of the packaging material.

31. An apparatus for wrapping a load with packaging material, the apparatus comprising:
a packaging material dispenser for dispensing packaging material to the load, the packaging material dispenser including a dispenser motor driven by an alternating current variable frequency drive (VFD);
a rotational drive configured to generate relative rotation between the packaging material dispenser and the load about a center of rotation; and
control logic configured to control a dispense rate of the packaging material dispenser during the relative rotation by controlling an alternating current variable frequency drive (VFD) of the packaging material dispenser to drive a dispenser motor, and detecting a packaging material break during the relative rotation by receiving an input signal representative of dispenser motor torque; and detecting using the input signal that the dispenser motor torque is below a work offset that offsets a torque associated with prestretching the packaging material.

32. A program product, comprising:
a computer readable medium; and
program code configured upon execution by a controller in an apparatus that wraps a load with packaging material using a packaging material dispenser adapted for relative rotation with the load about a center of rotation and including a dispenser motor driven by an alternating current variable frequency drive (VFD), wherein the program code is configured to control a dispense rate of the packaging material dispenser during the relative rotation to maintain a substantially constant torque for the dispenser motor while maintaining a speed of the dispenser motor within a speed window that is based at least in part on a rate of relative rotation between the packaging material dispenser and the load, wherein the program code is configured to control the dispense rate to maintain the substantially constant torque for the dispenser motor while maintaining the speed of the dispenser motor within the speed window by:
receiving a first input signal representative of the rate of relative rotation between the packaging material dispenser and the load;
receiving a second input signal representative of dispenser motor torque; and
controlling a speed of the dispenser motor in response to the first and second input signals to control the torque of the dispenser motor to match a torque setpoint.

* * * * *